(12) United States Patent
Hildebrand et al.

(10) Patent No.: US 8,083,944 B2
(45) Date of Patent: Dec. 27, 2011

(54) REMOVING AMMONIA FROM WASTE WATER DURING COLD WEATHER MONTHS

(75) Inventors: Martin Hildebrand, Steinbach (CA); Merle Kroeker, Winnipeg (CA); Byron Heppner, Winnipeg (CA)

(73) Assignee: Nelson Environmental Inc, Winnipeg, MB (CA)

( * ) Notice: Subject to any disclaimer, the term of this patent is extended or adjusted under 35 U.S.C. 154(b) by 0 days.

(21) Appl. No.: 13/009,342

(22) Filed: Jan. 19, 2011

(65) Prior Publication Data

US 2011/0174731 A1    Jul. 21, 2011

Related U.S. Application Data

(60) Provisional application No. 61/296,168, filed on Jan. 19, 2010.

(51) Int. Cl.
*C02F 3/00*    (2006.01)
(52) U.S. Cl. .......................................... 210/615; 210/903
(58) Field of Classification Search .......... 210/615–619, 210/903
See application file for complete search history.

(56) References Cited

U.S. PATENT DOCUMENTS

| | | | | |
|---|---|---|---|---|
| 6,200,469 | B1 * | 3/2001 | Wallace | 210/150 |
| 6,406,627 | B1 * | 6/2002 | Wallace | 210/602 |
| 6,652,743 | B2 * | 11/2003 | Wallace et al. | 210/170.01 |

* cited by examiner

*Primary Examiner* — Chester Barry
(74) *Attorney, Agent, or Firm* — Michael R. Williams; Ade & Company Inc.

(57) ABSTRACT

Described herein is a Submerged Attached Growth Reactor (SAGR) which provides nitrification (ammonia removal) from wastewater in cold to moderate climates. The system described herein is novel in that the SAGR reactor includes more than one influent distribution point. Specifically, in addition to the first influent distribution point at the front end of the reactor, there is provided at least one additional distribution point(s) downstream of this first distribution point for introduction of influent into the reactor. As a result of this arrangement, when a second low carbonaceous biochemical oxygen demand (CBOD), high nitrogen influent is distributed into the reactor at a location downstream of the initial influent entry point, a second (or more) population of bacteria (mainly nitrifying bacteria) is established and/or maintained in a physically discrete part of the overall treatment reactor. This second (or more) population at a discrete location within the reactor is useful in the removal of ammonia from high CBOD influent when the reactor is exposed to low temperatures.

1 Claim, No Drawings

REMOVING AMMONIA FROM WASTE WATER DURING COLD WEATHER MONTHS

PRIOR APPLICATION INFORMATION

The instant application claims the benefit of U.S. Provisional Patent Application 61/296,168, filed Jan. 19, 2010.

BACKGROUND OF THE INVENTION

Compounds such as organic matter and nitrogen contained in wastewater are capable of being oxidized and transformed by bacteria which use these compounds as a food source. Typically, heterotrophic bacteria digest the organic matter while nitrifying bacteria use the non-carbon compounds, for example, oxidizing ammonia to nitrate (a process know as nitrification to those skilled in the art).

The prior art, for example the US Environmental Protection Agency Manual on Nitrogen Control (USEPA, 1993); Wastewater Engineering, Treatment and Reuse, $4^{th}$ Edition (Metcalf and Eddy, 2003); Small and Decentralized Wastewater Management Systems (Crites and Tchobanoglous, 1998); and Design and Retrofit of Wastewater Treatment Plants for Biological Nutrient Removal (Randall et al., 1992), teaches that nitrifying bacteria are much more cold sensitive and as a consequence the nitrification process virtually ceases when the water temperature approaches 4° C.

A common form of biological wastewater treatment is the sewage treatment lagoon and these lagoons typically discharge elevated levels of ammonia during winter months in regions in which the water temperatures approaches 4° C. or lower. In view of changing environmental regulations, it would be highly advantageous to develop a biological treatment process that could remove ammonia at water temperatures of less than 4° C.

U.S. Pat. No. 6,200,469 and related U.S. Pat. Nos. 6,406,627 and 6,652,743 teach a system for removing pollution from water, utilizing a subsurface constructed wetland system using forced bed aeration and variable water levels to establish staged anaerobic and aerobic zones within the system. This prior art is relevant to the current invention because it teaches a method for delivering oxygen to the wastewater via aeration in a system utilizing attached-growth bacteria for treatment. However, the prior art does not teach a method for improved removal of ammonia at water temperatures approaching 4° C.

SUMMARY OF THE INVENTION

According to a first aspect of the invention, there is provided a method of improving ammonia removal from waste water during cold weather months comprising:

in a sewage treatment system comprising a submerged attached growth reactor (SAGR), said SAGR having an inlet distribution point proximal to an inlet end of the SAGR for receiving an influent and at least one additional downstream distribution point downstream of the inlet distribution point, transferring a low carbonaceous biochemical oxygen demand (CBOD) and high nitrogen effluent to the SAGR at said inlet distribution point during warm weather months, thereby establishing and maintaining an inlet population of nitrifying bacteria proximal to the inlet distribution point;

transferring a low carbonaceous biochemical oxygen demand (CBOD) and high nitrogen effluent to the SAGR at said downstream distribution point during said warm weather months, thereby establishing and maintaining a downstream population of nitrifying bacteria at a discrete location separate from the inlet population of nitrifying bacteria, proximal to the downstream distribution point; and transferring a high carbonaceous biochemical oxygen demand (CBOD) and high nitrogen effluent to the SAGR at said inlet distribution point during cold weather months, wherein the downstream population of nitrifying bacteria are available to remove ammonia from the effluent not removed in the region of the inlet distribution point.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

As used herein, 'heterotrophic bacteria' refers to bacteria capable of utilizing organic material. It is of note that generas of such bacteria are well known within the art and one of skill in the art will understand that this refers to specific bacteria of this type known to be present in for example treatment lagoons.

As used herein, nitrifying bacteria refers to bacteria capable of oxidizing ammonia to nitrate. It is of note that such bacteria are well known within the art and one of skill in the art will understand that this refers to specific bacteria of this type known to be present in for example treatment lagoons.

As used herein, "winter months" or "cold weather months" or "cold months" refers to months in which the water temperature approaches 4° C.

As used herein, "warm weather months" or "warm months" refers to months in which the water temperature is typically considerably higher than 4° C.

Described herein is a Submerged Attached Growth Reactor (SAGR) which provides nitrification (ammonia removal) from wastewater in cold to moderate climates. The SAGR is essentially a gravel (or other similar material) bed with one or more horizontal chambers throughout. The chamber system is used to distribute the wastewater flow across the width of the cell, and a horizontal collection chamber at the outlet of the system is used to collect treated water. This distribution is desired to ensure horizontal flow throughout the gravel media and optimize hydraulic efficiency, although alternate (vertical) flow paths could achieve similar treatment results, and are contemplated by this invention. Linear aeration proximate to the bottom of the SAGR provides aerobic conditions that are required for nitrification. In some embodiments, the gravel bed may be covered with a layer of an insulating material, for example, peat or wood chips. The system described herein is novel in that the SAGR reactor includes more than one influent distribution point. Specifically, in addition to the first or inlet influent distribution point at the inlet end of the reactor, there is provided at least one additional distribution point(s) downstream of this first or inlet distribution point for introduction of influent into the reactor. This may take the form of a single reactor with multiple distribution points within, or multiple reactors in series with one or more distribution points in each. As discussed below, as a result of this arrangement, when a second low carbonaceous biochemical oxygen demand (CBOD), high nitrogen influent is distributed into the reactor at a location downstream of the initial influent entry point, a second population of bacteria (mainly nitrifying bacteria) can be established and/or maintained in a physically discrete part of the overall treatment reactor, separate and distinct from the population at the inlet end of the reactor.

According to an aspect of the invention, there is provided a method of improving ammonia removal from cold temperature waste water comprising:

in a sewage treatment system comprising a sewage treatment lagoon and a submerged attached growth reactor (SAGR), said SAGR having a first distribution point proximal to the inlet end of the SAGR for receiving an influent from the sewage treatment lagoon and at least one additional distribution point downstream of the first distribution point, said sewage treatment lagoon transferring a low carbonaceous biochemical oxygen demand (CBOD), and potentially high nitrogen effluent to the SAGR at downstream distribution point(s) during warm weather months and a high CBOD, high nitrogen effluent to the SAGR at said first distribution point during cold weather months, said SAGR having a colony of nitrifying bacteria proximal to the distribution points;

periodically distributing a low CBOD, high nitrogen influent into the SAGR at the downstream distribution point(s) during the warm weather months, thereby establishing and maintaining a downstream colony of nitrifying bacteria at a discrete location, separate from the first end colony of nitrifying bacteria, Wherein during low temperature months, the downstream population(s) of nitrifying bacteria are available to remove ammonia not removed in the region of the first distribution point.

According to another aspect of the invention, there is provided a method of improving ammonia removal from waste water during cold weather months comprising:

in a sewage treatment system comprising a submerged attached growth reactor (SAGR), said SAGR having an inlet distribution point proximal to an inlet end of the SAGR for receiving an influent and at least one additional downstream distribution point downstream of the inlet distribution point, transferring a low carbonaceous biochemical oxygen demand (CBOD) and high nitrogen effluent to the SAGR at said inlet distribution point during warm weather months, thereby establishing and maintaining an inlet population of nitrifying bacteria proximal to the inlet distribution point;

transferring a low carbonaceous biochemical oxygen demand (CBOD) and high nitrogen effluent to the SAGR at said downstream distribution point during said warm weather months, thereby establishing and maintaining a downstream population of nitrifying bacteria at a discrete location separate from the inlet population of nitrifying bacteria, proximal to the downstream distribution point; and transferring a high carbonaceous biochemical oxygen demand (CBOD) and high nitrogen effluent to the SAGR at said inlet distribution point during cold weather months, wherein the downstream population of nitrifying bacteria are available to remove ammonia from the effluent not removed in the region of the inlet distribution point.

It is known in the art that the discharge of elevated levels of ammonia during winter months from a sewage treatment lagoon is due to the temperature effects.

Specifically, the inventors discovered that there can be a large parallel increase in the carbonaceous biological oxygen demand (CBOD) released from a sewage treatment lagoon during the winter months. CBOD is the food source for heterotrophic bacteria. Furthermore, while the ammonia concentrations increased during the winter months, there was a recovery in the ability to remove ammonia in the SAGR unit over time even when the water temperatures were still near or below 4° C. This implied that there was a re-activation or re-growth of nitrifying bacteria even at water temperatures just above freezing which is contrary to the current teachings in the art.

This led to a closer examination of how CBOD is removed by an SAGR system. Research indicated that all of the CBOD was removed in the first zone of the reactor volume, implying that the heterotrophic bacteria must reside in the first zone of the SAGR reaction vessel.

Analysis of the removal of ammonia demonstrated that during the early winter period, ammonia removal occurred within this same first zone of the reaction vessel. This implies that this was the only portion of the reaction vessel in which the nitrifying bacteria had a suitable food supply. However, once CBOD released from the lagoon into the SAGR began to increase later in winter, ammonia removal decreased dramatically. Specifically, it was observed that very little ammonia was being removed downstream of this first zone of the reaction vessel which implied that there were very few nitrifying bacteria downstream of the first zone or quarter of the reaction vessel.

However, it was found on subsequent sampling of the reaction vessel that surprisingly, removal of nitrogen in the second zone of the reaction vessel developed which had not been present previously. This indicated the establishment of a second population of nitrifying bacteria in the second zone of the reaction vessel which was completely unexpected.

Based on this surprising discovery, the inventors realized that the decrease in ammonia removal levels during mid-winter was not simply the result of cold water temperatures but that other factors were involved. Specifically, based on the observations, although not wishing to be bound to a specific theory or hypothesis, the inventors believe that contrary to the teaching of the prior art, the decrease in ammonia removal levels is not solely because the nitrifying bacteria are slowed by the low temperatures but because they are migrating to or establishing in a different zone in the vessel.

In an ideal situation, there would be a perfect split, with all heterotrophic bacteria staying in the lagoon, removing 100% of CBOD in the lagoon, and all nitrifying bacteria staying in the SAGR and removing all of the ammonia. In the real world, there is a region where both occur. While the two bacteria can co-exist, heterotrophs will typically out-compete the nitrifiers if there is food present. For this reason, it is commonly understood that nitrification only starts to occur once the CBOD has been reduced in a typical influent from approximately 200 mg/l down to around 30 mg/l. The amount of CBOD reduction occurring in the lagoon varies with temperature, as the treatment from heterotrophic bacteria slows down in cold temperatures, resulting in elevated CBOD levels in the effluent leaving the lagoon during the winter months The said effluent (having elevated CBOD levels) enters the SAGR, causing an increase in heterotrophic activity in this first zone of the reactor, either from new bacteria growing or from existing heterotrophic bacteria competing more strongly against the nitrifying bacteria (due to the presence of a higher level of suitable food supply) in the same reactor volume. It is important to note that the end result is the same—the heterotrophic bacteria have the potential to out-compete the nitrifying bacteria in the first zone of the reactor, leading to a decrease in the amount of ammonia removed from the wastewater in the first zone of the SAGR reactor. As a result, the remaining ammonia migrates further down the SAGR reactor. In warm water, if the reactor was subjected to a sufficiently high CBOD influent, new nitrifying colonies would form downstream of the first region and remove the remaining ammonia. However, at very cold water temperatures, new colonies of nitrifying bacteria do not form fast enough, resulting in ammonia passing through the system without sufficient treatment.

Based on this discovery, the inventors realized that establishing and maintaining a second population of nitrifying bacteria in a region of the reactor downstream of the first region of the reactor would have several benefits.

Specifically, a multiple-feed SAGR was developed in which influent could be distributed into two or more discrete locations within the reactor.

The multiple feed SAGR reactor was supplied effluent from a treatment lagoon which typically had low amounts of CBOD in the summer months and high levels of CBOD in the winter months and a relatively constant release of ammonia throughout the year (although lower in summer than in winter). A low CBOD, relatively constant ammonia effluent was distributed into the reactor throughout the summer months which established a population of nitrifying bacteria downstream of the initial influent entry point into the reactor. As a comparison, the prior art method of simply distributing the influent into the reactor at a single location throughout the year so that the reactor processes a low CBOD, relatively constant ammonia influent in the summer months and a high CBOD, constant ammonia influent in the winter months was tested in parallel to establish a basis of comparison although the process is not limited to having constant ammonia levels in summer.

Not surprisingly, the ammonia response curve of the single-feed system followed the same general pattern as anticipated by the prior art—an increase in effluent ammonia over time at cold water temperatures.

However, in the multiple-feed system, there was no perceptible increase in the effluent ammonia concentrations, meaning that the downstream colony of nitrifying bacteria had been established and was maintained by the distribution of the low CBOD, relatively constant ammonia influent over the warm-weather months. Thus, as a consequence of this design strategy, there was a second colony of bacteria ready and waiting to treat the ammonia nitrogen downstream of the initial influent distribution point within the reactor.

The establishment of the additional populations of treatment microbes would also be beneficial in a situation in which the influent entering the SAGR had a constant CBOD. The portion of the SAGR required to remove this level of CBOD is small, but the size of the CBOD removal zone may fluctuate with temperature, requiring a larger volume in winter when reaction rates are slow, and a smaller volume in summer when microbial reaction rates are high, potentially resulting in additional heterotrophic encroachment into the nitrifying zone under certain conditions. The multiple-feed concept will also prevent any adverse effects of this fluctuating CBOD removal zone again by providing and maintaining additional nitrifying zones downstream.

Thus, by establishing and maintaining multiple discrete populations of nitrifying microbes within the reactor, the reactor contains a multiplicity of nitrifying microbial populations, each of which is sized appropriately for removing the full ammonia nitrogen loading according to seasonal conditions. In winter, when the cold water temperatures cause the nitrifying microbes to slow-down, having multiple populations allows for the removal of the full amount of ammonia. This is important, because the populations do not respond quickly at very low temperatures, taking a long time to grow a larger population if there are not enough bacteria, which may not be a sufficient response time depending on regulatory permit requirements.

It is important to note that the key aspect of the invention is the establishment and maintenance of additional populations of nitrifying microbes at multiple, discrete, downstream locations within the SAGR reactor. The supply of additional ammonia nitrogen downstream is critical for the establishment of the additional colonies during the summer months as the nitrifying microbes in the vicinity of the initial distribution site into the reactor are sufficient to convert the ammonia in the influent to nitrate-nitrogen or nitrogen gas. As a result of this arrangement, the reactor contains many times more microbes than could be grown in a single-feed system, so that the associated microbial community is capable of doing full treatment even as biological kinetics slow down due to temperature effects.

The invention also provides at least two discrete zones, one for nitrification, and one for BOD removal. It is of note that a multiplicity of distribution zones would enhance treatment efficiency, and such arrangements are within the scope of the invention. Because the volumes required for each treatment objective vary with temperature and mass loading, and potential treatment problems are caused at the boundary layer due to the heterotrophic microbes out competing the nitrifying microbes, growing a discrete nitrifying population in multiple downstream regions of the treatment reactor ensures that the treatment vessel zone most responsible for regulatory compliance remains available for nitrification. This effectively leaves a region in between the distribution zones where the heterotrophic population can shrink and expand without having a direct effect on the nitrifying microbes, which is a novel and unique aspect of this invention.

It is important to note that the prior art teaches distributing the influent at the front of the reactor, and waiting for the nitrifying microbes to establish wherever they can, which will be at the front of the reactor (for example, the first region of the reactor), and in turn results in poor winter treatment. This is considered state of the art and accepted by designers of biological wastewater treatment systems. This is not our invention, which is the establishment and maintenance of additional populations of nitrifying microbes by distributing influent into one or more discrete sites downstream of the initial influent entry point, which dramatically increases the ammonia-nitrogen removal efficiency of the treatment reactor; especially at water temperatures less than 4 degrees Celsius.

Influent into the SAGR is typically an effluent from a standard municipal treatment lagoon, having estimated concentrations of CBOD5 20-40 mg/l; total suspended solids (TSS) 20-40 mg/l; and ammonia of approximately 25-45 mg/l. However the SAGR is not limited to treating effluent from a lagoon process. The process is applicable to any other nitrification applications where low water temperature conditions are present.

The length of the SAGR is typically 40-75 ft long with a depth of between 4-12 ft. The width of the SAGR will vary as a function of flow. For example, more flow from a larger population base will result in a wider system Retention time of the wastewater in the SAGR is a function of wastewater concentration, but is typically in the range of 4-6 days, but will vary according to the mass load applied to the SAGR).

Influent into the lagoon will typically be raw municipal wastewater, CBOD 150-250 mg/l; TSS 20-40 mg/l; total Kjeldahl Nitrogen (TKN) 25-45 mg/l; ammonia 20-40 mg/l; and total phosphorus 6-8 mg/l.

A treatment lagoon will typically have a depth between 5 and 20 ft and will typically have somewhere between 20 and 45 days of retention time for the wastewater. The volume of the lagoons depend on the population base feeding the lagoon.

It is important to note that the above stated dimensions for the lagoon and the reactor and the characteristics of the influents are intended for illustrative purpose only. For example, in practice, the system of the invention can handle influents that are much stronger, or much more dilute without difficulty.

CBOD removal is typically measured at 20° C., and factored down using a first order equation, resulting in a removal rate at 0.5° C. that is approximately half of the rate at 20° C. However, a lagoon may still remove a significant amount of CBOD at these low temperatures, because it may have had more retention time available than was required at the warm temperatures. (All water temperatures). It is of note that 0.5° C. is generally accepted as the minimum temperature for a treatment system because at lower temperatures, ice will form.

While the preferred embodiments of the invention have been described above, it will be recognized and understood that various modifications may be made therein, and the appended claims are intended to cover all such modifications which may fall within the spirit and scope of the invention.

The invention claimed is:

1. A method of improving ammonia removal from waste water during cold weather months comprising:

in a sewage treatment system comprising a submerged attached growth reactor (SAGR), said SAGR having an inlet distribution point proximal to an inlet end of the SAGR for receiving an influent and at least one additional downstream distribution point downstream of the inlet distribution point, transferring a low carbonaceous biochemical oxygen demand (CBOD) and high nitrogen effluent to the SAGR at said inlet distribution point during warm weather months, thereby establishing and maintaining an inlet population of nitrifying bacteria proximal to the inlet distribution point;

transferring a low carbonaceous biochemical oxygen demand (CBOD) and high nitrogen effluent to the SAGR at said downstream distribution point during said warm weather months, thereby establishing and maintaining a downstream population of nitrifying bacteria at a discrete location separate from the inlet population of nitrifying bacteria, proximal to the downstream distribution point; and transferring a high carbonaceous biochemical oxygen demand (CBOD) and high nitrogen effluent to the SAGR at said inlet distribution point during cold weather months, wherein the downstream population of nitrifying bacteria are available to remove ammonia from the effluent not removed in the region of the inlet distribution point.

* * * * *